United States Patent Office 3,401,030
Patented Sept. 10, 1968

3,401,030
METHOD OF DEFOLIATING COTTON PLANTS
Robert V. Berthold, South Charleston, W. Va., and Richard A. Herrett, Raleigh, N.C., assignors to Union Carbide Corporation, a corporation of New York
No Drawing. Filed Sept. 9, 1964, Ser. No. 395,298
3 Claims. (Cl. 71—69)

ABSTRACT OF THE DISCLOSURE

Cotton plants are defoliated by applying to them imidazopyridines especially 3H - 6 - chloromidazo[4,5-b]pyridine.

---

This invention relates to methods and compositions for the defoliation of plants. More particularly, this invention is concerned with methods and compositions for defoliating cotton plants, and with the use of highly specific cotton defoliant imidazopyridines.

In harvesting agricultural crops with mechanical equipment, the plant leaves often interfere with effective operation of the harvesting machine. In addition, the quality of the harvested product may be deleteriously affected by the presence of leaves. For example, in the case of cotton, the presence of leaves results in a discolored harvested crop. With the increase in mechanized harvesting of crops, it has become increasingly important to find efficient methods for defoliation.

It has long been known to treat crop plants chemically with the object of inducing defoliation and thereby facilitating harvesting of the crop by mechanical means. However, most of the chemicals used heretofore, particularly inorganic chemicals such as the chlorate-borate mixtures, achieve this object primarily by subjecting the plant to what may be termed "biological shock," characterized by freezing of the leaves and chlorosis, stunting, burning of the plant, and the like, as opposed to pure defoliation in which the abscission cells in the leaf petiole are selectively affected to cause the leaves to fall off while leaving the remainder of the plant unharmed. To achieve substantially pure defoliation is particularly important when treating cotton plants where the presence of burned leaves frozen to the plant can deleteriously affect both yield and quality of the harvested crop.

The imidazopyridines contemplated for use in this invention possess the ability, to a degree not approached by prior materials, to induce highly selective pure defoliation of cotton plants. In addition, use of these imidazopyridines has been effective in defoliating actively growing cotton normally only treated with great difficulty and, furthermore, has been found to substantially obviate regrowth problems encountered when employing known defoliants. Furthermore, the imidazopyridines disclosed herein have the ability to suppress regrowth of cotton foliage once defoliation has taken place. All these desiderata are achieved when employing extremely low (relative to the quantities of known defoliants normally required) concentrations of these materials.

Accordingly, an object of this invention is to provide highly specific cotton defoliants. Another object is to provide imidazopyridines which possess highly specific cotton defoliant properties. A further object is to provide methods and compositions for defoliating cotton plants using as the active defoliating agent one or more imidazopyridines disclosed hereinafter. A specific object is to provide methods and compositions for defoliating cotton plants using 3H-6-chloroimidazo[4,5-b]pyridine as the active defoliating agent. These and other objects will become apparent to those skilled in the art to which this invention pertains from the ensuing description thereof.

The imidazopyridines used in this invention can be represented by Formulae I, II, III, and IV:

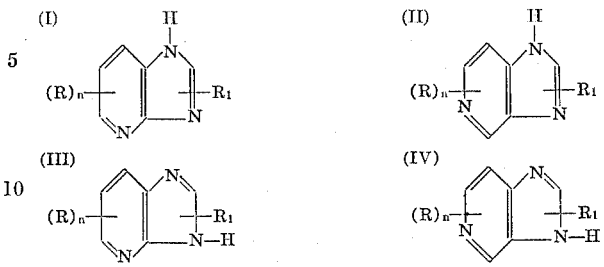

wherein R is either halogen, especially chlorine, bromine or iodine, and particularly a middle-halogen (chlorine or bromine), amino, nitro, or lower alkyl, with the proviso that each R is on a different ring carbon atom; $R_1$ is hydrogen or lower alkyl; $n$ is an integer of from 0 to 3, inclusive; and the acid addition and quaternary ammonium salts thereof. When R and $R_1$ are lower alkyl, the lower alkyl group preferably contains from 1–8 carbon atoms, with from 1–5 carbon atoms most preferred. The lower alkyl group can be branched or straight chain and is preferably unsubstituted, but can bear simple substituents which do not adversely affect the desired properties of the imidazopyridines disclosed herein. This invention intends to include mixtures of compounds represented by the aforementioned formulae.

The imidazopyridines of this invention can be characterized as imidazo[b]pyridines and imidazo[c]pyridines as represented by 1H-5,6,7-substituted imidazo[4,5-b]pyridines (Formula I), 3H-5,6,7-substituted imidazo[4,5-b]pyridines (Formula III), 1H - 4,6,7 - substituted imidazo[4,5-c]pyridines (Formula II), and 3H-4,6,7-substituted imidazo[4,5-c]pyridines (Formula IV), respectively. Of the aforementioned imidazopyridines, those preferred are the imidazo[b]pyridines, particularly the 1H-5,6, and/or 7-halo-substituted imidazo[4,5-b]pyridines and 3H-5,6, and/or 7-halo-substituted imidazo[4,5-b]pyridines, especially those wherein halo is chloro or bromo. The compounds of this invention also can be characterized as substituted azabenzimidazoles.

Preferred imidazo[b]pyridines can be specifically represented by Formulae V and VI:

wherein each $R_2$ is either methyl, chloro, bromo, nitro, or amino; and $n$ is an integer of from 0 to 3, inclusive, preferably 1.

Representative imidazopyridines encompassed within this invention includes, for example, 1H-6-chloroimidazo[4,5,-b]pyridine,
3H-6-chloroimidazo[4,5-b]pyridine,
1H-6-chloroimidazo[4,5-c]pyridine,
3H-6-chloroimidazo[4,5-c]pyridine,
1H-7-chloroimidazo[4,5-b]pyridine,
1H-5-chloroimidazo[4,5-b]pyridine,
3H-7-chloroimidazo[4,5-b]pyridine,
3H-5-chloroimidazo[4,5-b]pyridine,
3H-6-bromoimidazo[4,5-b]pyridine,
3H-6-iodoimidazo[4,5-b]pyridine,
3H-5,6,7-trichloroimidazo[4,5-b]pyridine,
3H-5,6-dichloroimidazo[4,5-b]pyridine,
3H-5,6,7-tribromoimidazo[4,5-b]pyridine,
1H-5,6,7-trichloroimidazo[4,5-b]pyridine,
1H-tribromoimidazo[4,5-b]pyridine,
3H-5,6-diiodoimidazo[4,5-b]pyridine, 3H-5,6,7-triiodoimidazo[4,5-b]pyridine,
3H-5-chloro-6-bromoimidazo[4,5-b]pyridine,
3H-5-chloro-6-iodo-7-bromoimidazo[4,5-b]pyridine,
3H-6-methylimidazo[4,5-b]pyridine,
3H-6-ethylimidazo[4,5-b]pyridine,
3H-6-propylimidazo[4,5-b]pyridine,
3H-6-isopropylimidazo[4,5-b]pyridine,
3H-6-tert-butylimidazo[4,5-b]pyridine,
1H-5,6,7,-trimethylimidazo[4,5-b]pyridine.
3H-6-chloro-7-methylimidazo[4,5-b]pyridine,
3H-6-nitroimidazo[4,5-b]pyridine,
3H-5,6-dinitroimidazo[4,5-b]pyridine,
3H-5,6,7-trinitroimidazo[4,5-b]pyridine,
1H-6-aminoimidazo[4,5-b]pyridine,
3H-6-aminoimidazo[4,5-b]pyridine,
3H-5,6,7-triaminoimidazo[4,5-b]pyridine,
3H-6-chloroimidazo[4,5-b]-2-methylpyridine,
3H-6-chloroimidazo[4,5-b]-2-isopropylpyridine,
3H-4-chloroimidazo[4,5-c]pyridine,
3H-4-bromoimidazo[4,5-c]pyridine,
3H-4-nitroimidazo[4,5-c]pyridine,
3H-4-aminoimidazo[4,5-c]pyridine,
and others.

The imidazopyridines used herein possess the advantage, in addition to their unusually high degree of activity, in agricultural applications in that they are organic compounds which will not leave persistent residues in the soil, in contrast to the inorganic defoliants.

The imidazopyridine which has performed best in the practice of this invention is the 3H-halo-substituted imidazo[b]pyridine, 3H-6-chloroimidazo[4,5-b]pyridine. This latter compound has been shown to exhibit outstanding properties as a specific defoliant for cotton plants. It also has a marked capacity to suppress regrowth of cotton foliage once defoliation has taken place. The marked cotton defoliant properties of 3H-6-chloroimidazo[4,5-b] pyridine was not expected in view of pyridine compounds known to possess herbicidal activity and to kill cotton plants.

In general, the imidazopyridines encompassed within this invention can be conveniently prepared by the reaction of the appropriate 2,3-diaminopyridine with from about 98 to about 100 percent by weight formic acid. The imidazopyridine product can be isolated by removal of excess formic acid by stripping at reduced pressure. The imidazopyridines are obtained via this route in high yield, and in most cases are sufficiently pure to be used as residue products; however, purification may be effected by recrystallization from suitable solvents known in the art.

The following example will illustrate the imidazopyridines of this invention and their preparation.

EXAMPLE I

3H-6-chloroimidazo[4,5-b]pyridine 28 grams (0.195 mole) of 5-chloro-2,3-diaminopyridine was added to 100 ml. of 98 percent by weight formic acid. This mixture was then heated under reflux for one hour. Excess formic acid present was removed under reduced pressure. The resultant solid residue was dissolved in boiling water and filtered while hot through activated charcoal. The cooled filtrate deposited 3H - 6 - chloroimidazo[4,5-b]pyridine as a pale yellow solid. The yield of 3H-6-chloroimidazo[4,5-b]pyridine was 77 percent. A second recrystallization from water produced almost colorless white needles of 3H - 6 - chloroimidazo[4,5-b] pyridine, M.P. 237–238° C.

*Analysis.*—Calculated for $C_6H_4N_3Cl$: C, 46.92; H, 2.63; N, 27.36; Cl, 23.09. Found for $C_6H_4N_3Cl$: C, 46.74; H, 2.40; N, 27.08; Cl, 23.09.

The following examples will illustrate the cotton defoliant properties of the imidazopyridines of this invention.

EXAMPLE II

In a series of greenhouse tests, 3H - 6 - chloroimidazo [4,5-b]pyridine was formulated by dissolving one gram of 3H-6-chloroimidazo[4,5-b]pyridine in 50 milliliters of acetone in which had been dissolved 0.1 gram (10 percent of the weight of the pyridine) of an alkylphenoxypolyethoxyethanol surfactant, as an emulsifying or dispersing agent. The resulting solution was mixed into 200 milliliters of water to give 250 milliliters of a suspension containing the pyridine in finely divided form. The thus-prepared stock suspension was diluted with water to give a test solution containing 2500 parts of the pyridine per million parts of solution, which was subsequently diluted to give test solutions of 1250 p.p.m., 625 p.p.m. and 312 p.p.m. of the pyridine, as noted in Table I, infra.

Two sets of young cotton plants (*Gossypium hirsutum L.*), one set with two secondary leaves fully expanded and third and fourth leaves just appearing (4 weeks old) and the second set with four secondary leaves fully expanded and the fifth and sixth leaves just appearing (10 weeks old) were placed on a revolving turntable and sprayed with the test solutions containing the pyridine for 30 seconds using a hand sprayer set at 40 p.s.i.g. Young control plants were sprayed with a check solution containing no active compound and with the proprietary materials S,S,S-tributylphosphorotrithioate and sodium cis-3-chloroacrylate formulated in a manner similar to the 3H-6-chloroimidazo[4,5-b]pyridine formulation. The plants were removed to the greenhouse and held at 80° F. for at least fourteen days and, after this period, the degree of defoliation and the severity of any injury were observed by visual inspection and rated as follows:

Defoliation rating:
  5=excellent defoliation
  4=good defoliation
  3=moderate defoliation
  2=poor defoliation
  1=no defoliation Injury or desiccation rating:
  5=plant dead
  4=severe desiccation
  3=moderate desiccation
  2=slight burn
  1=no injury Table I sets forth the results obtained from the aforementioned procedure using the aforementioned ratings.

TABLE I

| Age (weeks) of cotton | | Concentration of active compound in parts per million | | | | | |
|---|---|---|---|---|---|---|---|
| | | 1,250 | | 625 | | 312 | |
| | | Def [1] | Des [2] | Def. | Des. | Def. | Des. |
| 4 | 3H-6-chloroimidazo [4,5-b]pyridine. | 5 | | 4 | 3 | 4 | 3 |
| 10 | do | 5 | | 5 | | 4 | 2 |
| 4 | Sodium cis-3-chloroacrylate. | 4 | 4 | 3 | 3 | 2 | 3 |
| 10 | do | 4 | 4 | 4 | 4 | 1 | 2 |
| 4 | S,S,S-tributyl phosphorotrithioate. | 3 | 3 | 3 | 2 | 3 | 2 |
| 10 | do | 4 | 2 | 4 | 3 | 2 | 3 |

Defoliation [1] and Desiccation [2] rated as hereinabove defined with reference to Table I.

It can be seen from Table I, that the cotton plants treated with 3H-6-chlorimidazo[4,5-b]pyridine showed only moderate to slight effects of leaf desiccation or other herbicidal effects with good defoliation.

EXAMPLE III 3H-6-chlorimidazo[4,5-b]pyridine, the most preferred imidazo[b]pyridine disclosed herein, was also tested as follows: vigorously growing cotton plants, having about 7 to 8 fully expanded leaves, were sprayed with aqueous solutions of 3H-6-chloroimidazo[4,5-b]pyridine and the known defoliant sodium cis-3-chloroacrylate to give the dosages indicated in Table II, infra., in pounds of active compound per acre. The water volume used was equivalent to 59 gallons per acre for all dosages. Fourteen days after spraying, the plants were examined and each test compound was rated on the basis of percent defoliation taken as an average of three tests. The results are set forth in Table II.

TABLE II

| | Pounds of active compound per acre | Defoliation in percent |
|---|---|---|
| 3H-6-chloroimidazo [4,5-b]pyridine | ⅛ | 96.2 |
| Do | ¼ | 96.6 |
| Do | ½ | 96.2 |
| Do | 1 | 100.0 |
| Sodium cis-3-chloroacrylate | 1 | 87.5 |
| Do | 2 | 91.0 |

It can be seen from Table II that at all concentrations tested, 3H-6-chloroimidazo[4,5-b]pyridine was superior to sodium cis-3-chloroacrylate in cotton defoliation.

Table III sets forth the percent of defoliation as an average of three tests wherein the ratings were made seventeen days after treatment.

TABLE III

| | Pounds of active compound per acre | Defoliation in percent |
|---|---|---|
| 3H-6-chloroimidazo[4,5-b]pyridine | 1/32 | 38 |
| Do | 1/16 | 64 |
| Do | ⅛ | 68 |
| Do | ¼ | 92 |
| Do | ½ | 88 |
| Sodium cis-3-chloroacrylate | 1 | 77 |
| Do | 2 | 91 |

When preparing the defoliants used in this invention the compounds described above can be admixed with an inert carrier. This carrier may be a liquid or a solid and should contain surface active agents. Suitable surface active agents are alkylphenylpolyethylene glycol ethers, dimeric alkylated aryl polyether alcohols, and the like. A sticker-spreader such as glycerine or a nonvolatile solid polyethylene glycol, may also be added to insure adhesion of the formulation to the plant after spraying.

Water is an ideal liquid carrier but suitable organic solvents may be employed. Formulation in water suspensions presents the simplest and easiest method of application. Alternatively, application may be made in the form of dusts or powders where the active compounds are admixed with a solid carrier such as clay, attapulgite, pyrophyllite, or talc. The concentration of the active ingredient in the final formulation, liquid or solid, may be from about 0.1 to about 10 percent by weight, with from about 0.1 to about 1.0 by weight preferred.

Generally, the effective amounts of the imidazopyridines range from about 0.1 to about 10 pounds per acre with from about 0.25 to about 2 pounds per acre preferred. The precise concentration, within the broad range, to be used in any given field will depend on the specific soil conditions, the variety and age of the cotton plants to be treated, the amount of foliage present and environmental factors such as temperature, light, humidity and rainfall. For example, as the cotton plant approaches maturity, it is more readily defoliated, thus requiring less chemical. Actively growing highly vegetative cotton plants are generally more difficult to defoliate. However, it is one of the features of the compounds contemplated for the use in this invention that actively growing cotton plants may be defoliated.

What is claimed is:

1. Method of selectively defoliating cotton plants which comprises applying to the plants a defoliatingly effective amount of an imidazopyridine of the formulae selected from the group consisting of:

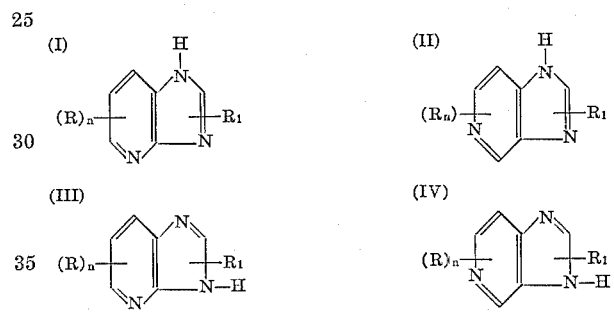

wherein R is halogen with the proviso that each R is on a different ring carbon atom; $R_1$ is hydrogen; $n$ is an integer of from 0 to 3, inclusive.

2. Method of selectively defoliating cotton plants which comprises applying to the plants a defoliatingly effective amount of 3H-6-chloroimidazo[4,5-b]pyridine.

3. Composition for selectively defoliating cotton plants containing a defoliatingly effective amount of 3H-6-chloroimidazo[4,5-b]pyridine and a major amount of an inert carrier therefor.

References Cited

UNITED STATES PATENTS

| 2,693,408 | 11/1954 | D'Amico | 71—2.5 |
| 2,844,577 | 7/1958 | Acker | 71—2.5 |
| 3,069,253 | 12/1962 | Sousa | 71—2.5 |

FOREIGN PATENTS 938,052   9/1963   Great Britain.

LEWIS GOTTS, *Primary Examiner.*

G. HOLLRAH, *Assistant Examiner.*